United States Patent
Frick

(10) Patent No.: US 9,939,865 B2
(45) Date of Patent: Apr. 10, 2018

(54) SELECTIVE STORAGE RESOURCE POWERING FOR DATA TRANSFER MANAGEMENT

(71) Applicant: Seagate Technology LLC, Cupertino, CA (US)

(72) Inventor: David G. Frick, Lafayette, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 76 days.

(21) Appl. No.: 14/506,101

(22) Filed: Oct. 3, 2014

(65) Prior Publication Data
US 2015/0362983 A1 Dec. 17, 2015

Related U.S. Application Data

(60) Provisional application No. 62/012,205, filed on Jun. 13, 2014, provisional application No. 62/012,219, filed on Jun. 13, 2014.

(51) Int. Cl.
G06F 1/32 (2006.01)
G06F 1/28 (2006.01)
(Continued)

(52) U.S. Cl.
CPC .............. *G06F 1/28* (2013.01); *G06F 1/3203* (2013.01); *G06F 1/3221* (2013.01); *G06F 1/3287* (2013.01); *G06F 3/0604* (2013.01); *G06F 3/0619* (2013.01); *G06F 3/0625* (2013.01); *G06F 3/0634* (2013.01); *G06F 3/0635* (2013.01); *G06F 3/0658* (2013.01); *G06F 3/0659* (2013.01); *G06F 3/0665* (2013.01); *G06F 3/0685* (2013.01); *G06F 3/0689* (2013.01); *G06F 11/2015* (2013.01);
(Continued)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS 5,504,882 A 4/1996 Chai et al.
5,778,374 A 7/1998 Dang et al.
(Continued)

FOREIGN PATENT DOCUMENTS

WO 2014-065841 A1 5/2014

OTHER PUBLICATIONS

Caulfield, et al., "Moneta: A High-performance Storage Array Architecture for Next-generation, Non-volatile Memories," Dept. of Computer Science & Engineering, U.C. San Diego, California, 2010, 11 pages.
(Continued)

*Primary Examiner* — Zahid Choudhury
(74) *Attorney, Agent, or Firm* — Holzer Patel Drennan

(57) ABSTRACT

A mass data storage system includes a plurality of communicatively coupled storage resources arranged within a power grid. Responsive to receipt of a data transfer request, a compute node of the mass data storage system selectively powers from an off state one or more of the storage resources to receive incoming data or act as a data source for a read operation.

20 Claims, 6 Drawing Sheets

(51) Int. Cl.
*G06F 3/06* (2006.01)
*G06F 11/20* (2006.01)

(52) U.S. Cl.
CPC .... *G06F 11/2094* (2013.01); *G06F 2201/805* (2013.01); *Y02B 60/1246* (2013.01)

(56) References Cited

U.S. PATENT DOCUMENTS

| | | |
|---|---|---|
| 6,560,155 B1 | 5/2003 | Hush |
| 6,766,420 B2 | 7/2004 | Rawson, III |
| 6,959,399 B2 | 10/2005 | King et al. |
| 6,986,075 B2 | 1/2006 | Ackaret et al. |
| 7,210,005 B2 | 4/2007 | Guha et al. |
| 7,237,129 B2 | 6/2007 | Fung |
| 7,318,164 B2 | 1/2008 | Rawson, II |
| 7,334,140 B2 | 2/2008 | Jones et al. |
| 7,434,090 B2 | 10/2008 | Hartung et al. |
| 7,443,759 B1 | 10/2008 | Rowlands et al. |
| 7,516,348 B1 | 4/2009 | Ofer |
| 7,568,122 B2 | 7/2009 | Mechalke et al. |
| 7,661,005 B2 * | 2/2010 | Spengler .............. G11B 33/126 365/226 |
| 7,673,167 B2 | 3/2010 | Elliott et al. |
| 7,699,023 B2 | 4/2010 | Chen et al. |
| 7,702,853 B2 | 4/2010 | Hetzler et al. |
| 7,859,834 B2 | 12/2010 | Fukuda et al. |
| 8,024,602 B2 | 9/2011 | DeCenzo et al. |
| 8,161,303 B2 * | 4/2012 | Hakamata ............ G06F 1/3221 360/69 |
| 8,161,317 B2 | 4/2012 | Ishii |
| 8,286,015 B2 | 10/2012 | Olarig et al. |
| 8,473,779 B2 | 6/2013 | Siewert et al. |
| 8,495,276 B2 | 7/2013 | Han et al. |
| 8,555,027 B2 | 10/2013 | Kimura et al. |
| 8,947,816 B1 | 2/2015 | Ryan et al. |
| 9,235,486 B1 | 1/2016 | Casaburi |
| 2005/0228943 A1 | 10/2005 | DeCenzo et al. |
| 2006/0206730 A1 | 9/2006 | Cartes et al. |
| 2007/0016811 A1 | 1/2007 | Suzuki |
| 2007/0220316 A1 * | 9/2007 | Guha .................. G06F 1/3221 714/6.12 |
| 2008/0093926 A1 | 4/2008 | Suzuki et al. |
| 2008/0276043 A1 * | 11/2008 | Hetzler ................ G06F 3/0614 711/114 |
| 2009/0083558 A1 * | 3/2009 | Sugiki .................. G06F 1/3203 713/320 |
| 2009/0089504 A1 | 4/2009 | Soran et al. |
| 2009/0119530 A1 * | 5/2009 | Fisk .................... G06F 1/3221 713/324 |
| 2009/0147393 A1 | 6/2009 | Hakamata |
| 2009/0198928 A1 * | 8/2009 | Kommu CHS ..... G06F 11/1458 711/162 |
| 2009/0249003 A1 | 10/2009 | Bates et al. |
| 2009/0271645 A1 * | 10/2009 | Mori .................... G06F 1/3221 713/320 |
| 2010/0011229 A1 | 1/2010 | Davis et al. |
| 2010/0138677 A1 | 6/2010 | Pagan et al. |
| 2011/0029787 A1 | 2/2011 | Day et al. |
| 2011/0083039 A1 | 4/2011 | Kim et al. |
| 2011/0239013 A1 | 9/2011 | Muller |
| 2011/0302224 A1 | 12/2011 | Yairi et al. |
| 2012/0233484 A1 * | 9/2012 | Rossi .................... G06F 1/3268 713/324 |
| 2012/0272038 A1 | 10/2012 | Wei et al. |
| 2012/0297114 A1 | 11/2012 | Koizumi |
| 2013/0346793 A1 | 12/2013 | Flynn et al. |
| 2014/0003180 A1 | 1/2014 | Matsuda |
| 2014/0047261 A1 * | 2/2014 | Patiejunas .............. G06F 1/266 713/330 |
| 2014/0297700 A1 | 10/2014 | Vongsouvanh et al. |
| 2015/0026488 A1 * | 1/2015 | El-Batal ................ G06F 3/0625 713/300 |
| 2015/0331476 A1 * | 11/2015 | Slik .......................... G06F 1/28 713/324 |
| 2015/0362968 A1 | 12/2015 | Jurey et al. |
| 2015/0362972 A1 | 12/2015 | Frick |
| 2015/0363109 A1 | 12/2015 | Frick et al. |
| 2015/0363126 A1 | 12/2015 | Frick |
| 2015/0363127 A1 | 12/2015 | Frick |
| 2015/0363288 A1 | 12/2015 | Frick |

OTHER PUBLICATIONS

Delaluz, et al., "Memory Energy Management Using Software and Hardware Directed Power Mode Control," Dept. of Computer Science & Engineering, Pennsylvania State University, Pennsylvania, 2001, 21 pages.

Deng, et al., "Architectures and Optimization Methods of Flash Memory Based Storage Systems," Journal of Systems Architecture 57, Department of Computer Science, Jinan University, China, 2011, 14 pages.

Dittia, et al, "The APIC Approach to High Performance Network Interface Design: Protected DMA and Other Techniques," Dept. of Computer Science, Washington University, St. Louis, MO, 1997, 24 pages.

Gibson, et al., "A Case for Network-Attached Secure Disks," School of Computer Science Carnegie Mellon University, Pittsburgh, PA, Sep. 1996, 19 pages.

Jin, et al., "High-speed Data Channel in the Disk Array System," Broadband European Networks and Multimedia Services 580, Sep. 1998, 2 pages.

Katz, Randy H., "High Performance Network and Channel-Based Storage," Computer Science Division, Dept. of EE and Computer Sciences, U.C Berkeley, CA, Sep. 1991, 41 Pages.

Kottke, Thomas, "An Economical Data Acquisition System for Measuring and Recording Multiple Channels of Information at High Rates," Army Research Laboratory, National Technical Information Service, U.S. Dept. of Commerce, Springfield, VA, Sep. 1995, 79 pages.

Kumon, Kouichi, "Overview of Next-Generation Green Data Center," Fujitsu Sci. Tech, vol. 48, No. 2, Apr. 2012, 7 pages.

Riedel, Erik, "Active Disks—Remote Execution for Network-Attached Storage," Dissertation, School of Computer Science Carnegie Mellon University, Pittsburgh, PA, Nov. 1999, 203 pages.

Tudor, et al., "On Understanding the Energy Consumption of ARM-based Multicore Servers," Sigmetrics, Dept. of Computer Science, National University of Singapore, 2013, 12 pages.

Vekiarides, Nicos, "Fault-Tolerant Disk Storage and File Systems Using Reflective Memory," Dept. of Electrical & Computer Engineering, Carnegie Mellon University, Pittsburgh, Pennsylvania, 1995, 11 pages.

Yousif, Mazin, "Shared-storage Clusters," Cluster Computing Journal abstract, vol. 2, Issue 4, North Carolina, Dec. 1999, 6 pages.

Author Unknown, "Adaptive Memory Technology in Solid State Hybrid Drives," Seatage, retrieved on Apr. 1, 2015, 3 pages, retrieved from http://www.seagate.com/tech-insights/adaptive-memory-in-sshd-master-ti/.

Author Unknown, "DX100," Quamtum, retrieved on May 13, 2015, 1 page, retrieved from: http://www.quantum.com/serviceandsupport/softwareanddocumentationdownloads/dx100/index.aspx.

* cited by examiner

SELECTIVE STORAGE RESOURCE POWERING FOR DATA TRANSFER MANAGEMENT

CROSS-REFERENCE TO RELATED APPLICATIONS

The present application claims benefit of priority to U.S. Provisional Patent Application No. 62/012,205 entitled "Off-line/On-line Mass Data Storage Management" and filed on Jun. 13, 2014, and also claims benefit of priority to U.S. Provisional Patent Application No. 62/012,219 entitled "Off-line/On-line Mass Data Storage System" and filed on Jun. 13, 2014. Both of these applications are specifically incorporated by reference for all that they disclose or teach.

SUMMARY

Implementations disclosed herein provide for selective powering from an off state at least one storage resource within a power grid of a data storage system responsive to receipt of a data transfer request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
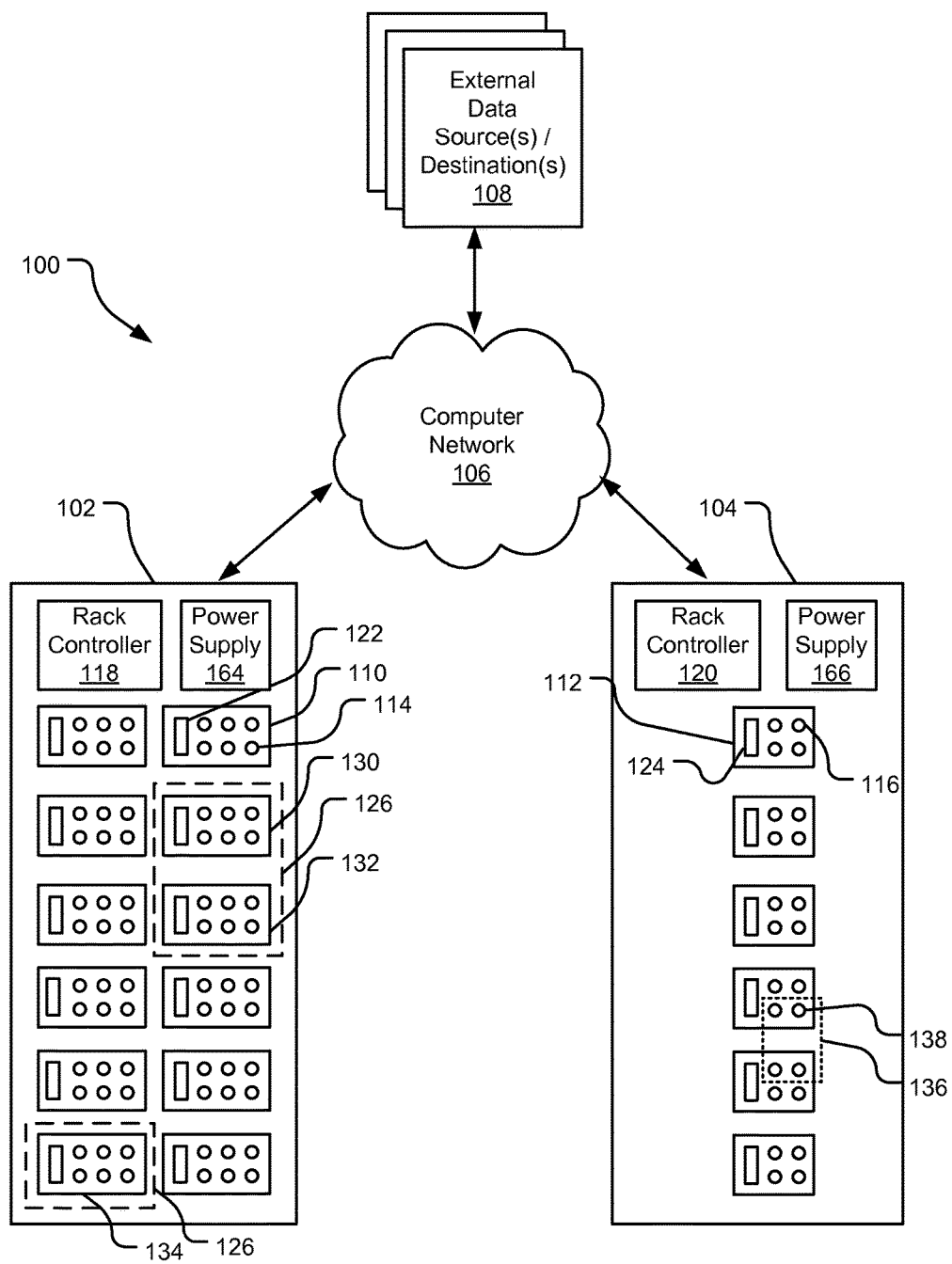
FIG. 1 illustrates an example mass data storage system with features for selective resource powering responsive to data transfer requests.

Efficient use of power is an important aspect of running data storage devices, especially in some embodiments such as a data center environment designed to serve as a public or private cloud storage system. On-line mass data storage (sometimes referred to as secondary or cloud storage) refers to one or more interconnected data storage units that are actively running and available for read/write operations. Example on-line mass data storage units include hard disk drives ("HDDs"), optical drives, solid state drives ("SSDs") and flash memory. Typically, time to data ("TTD") for on-line mass data storage units is less than 2 milliseconds. On-line mass data storage benefits from very high TTD capabilities, but is expensive to build and operate. More specifically, individual on-line mass data storage units are of high-quality, driving build costs up, and they consume significant power in an on-line state, driving operating costs up.

Near-line (or near on-line) mass data storage refers to one or more interconnected data storage units that are powered on, but in a low power consumption state and are brought to an on-line state before running read/write operations. Hard disk drives, optical drives, and/or flash memory drives may also be used for near-line storage, with the difference being an added mechanism to bring a selected storage unit to an on-line state for read/write operations. Such example mechanisms are robotic near-line storage (i.e., the system is aware of where a desired data chunk resides on a physical volume and utilizes a robotic mechanism to retrieve the physical volume for read/write operations) and hard drive near-line storage (e.g., massive array of idle discs ("MAID")). MAID systems archive data in an array of disc drives that are operating in a standby power state, but most of which are not spinning. The MAID system spins up each disc drives on demand when desired to perform read/write data on a disc within that drive. Typically, TTD for MAID-type near-line mass data storage units is less than 4 milliseconds. Near-line mass data storage systems have lower operating costs than on-line mass data storage systems due to the reduced power demand, but have similar build costs.

Off-line (or cold) mass data storage refers to one or more interconnected data storage units that are kept in a power off state and/or utilize remotely located storage media to store data. Typically, off-line mass data storage utilizes one or more interconnected tape drives, each with numerous tapes associated with the drive. As discussed above with regard to robotic near-line storage, a desired tape is retrieved from its storage location and loaded into its associated drive for read/write operations. In off-line tape mass data storage units, the desired tape is often manually retrieved and loaded, and as a result TTD for off-line tape mass data storage units can be greater than 24 hours. While the build and operating costs of off-line tape mass data storage are low, some applications require a faster access time than 24 hours, but not as fast as on-line or near-line mass data storage systems.

The disclosed off-line HDD mass data storage systems can achieve TTD greater than 4 ms and typically faster than that of off-line tape mass data storage while maintaining build and operating costs competitive with off-line tape mass data storage. This is accomplished, in part, by selectively powering resources in a mass data system to transfer data (e.g., read or write) to the system while complying with stringent power efficiency requirements.

FIG. 1 illustrates an example mass data storage system 100 with features for selective resource powering responsive to data transfer (e.g., read or write) requests. The storage system 100 (e.g., a server cluster or farm) is comprised of a number of storage racks (e.g., storage racks 102, 104) oriented in adjacent or separate physical locations or facilities (e.g., data rooms or centers). In some implementations, a first quantity of storage racks is located in a first server facility, a second quantity of storage racks is located in a second server facility, and so on. The server facilities may be separated by any distance (e.g., several feet or many miles). The storage system 100 may accommodate any number of storage racks and each rack is located in one of any number of server facilities. The storage system 100 may accommodate any use of mass data storage (e.g., content delivery, backup, archiving, running scientific simulations such as computational fluid dynamics, and rendering computer generated imagery, such as a render farm).

The individual storage racks are interconnected to one another via a computer network 106 (e.g., Gigabit Ethernet or a custom interconnect network). Further, the interconnected storage racks may be connected to one or more external data source(s)/destination(s) 108 via the same computer network 106 or an additional interconnected network (e.g., a local area network or a wide area network, not shown) using a variety of communication protocols (e.g., transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, and frame relay). As a result, data may be moved between the individual storage racks and the external data source(s)/destination(s) 108 as desired.

Each individual storage rack includes an array of storage media units (also referred to as physical zones), each selectively powered by a power supply and controlled by a rack controller (alternatively referred to as a storage rack server or a storage system server). For example, storage rack 102 includes 12 individual storage media units (e.g., storage media unit 110) and power supply 164 controlled by rack controller 118. Storage rack 104 includes 6 individual storage media units (e.g., storage media unit 112) and power supply 166 controlled by rack controller 120. In some implementations, individual storage racks may include greater or fewer individual storage media units than the depicted 12 and 6 storage media units per storage rack. In other implementations, some racks may not include a rack controller and/or an individual rack controller may control multiple racks.

Each media unit within a storage rack comprises an array of individual storage drives controlled by a media unit controller. For example, the media unit 110 includes 6 individual storage drives (e.g., storage drive 114) controlled by media unit controller 122. The media unit 112 includes 4 individual storage drives (e.g., storage drive 116) controlled by media unit controller 124. In other implementations, individual storage media units may include greater or fewer storage drives than the depicted 6 and 4 storage drives per media unit.

The power supplies may power multiple media units or a single media unit. An upper end power capability of each individual power supply may determine how many storage drives may be operated simultaneously by that power supply, which may range from a single media unit to multiple media units.

In some implementations, the individual media units are selectively installed and uninstalled from the storage rack (e.g., configured as a blade, which corresponds to the storage rack physical configuration). In an example standard server-rack configuration, the individual storage racks are each subdivided into individual rack units (e.g., 42 rack units), where each media unit is physically dimensioned to fill one rack unit (i.e., 19 inches wide by 1.75 inches tall) and thus each storage rack can accommodate a total of 42 media units. In other implementations, the storage rack is physically dimensioned to accommodate any desired number of media units.

In one implementation, each storage drive is a distinct storage medium or set of storage media with some or all of the read/write control functions of the storage drive removed to the corresponding media unit controller and/or rack controller of the mass data storage system 100. As a result, one or both of the media unit controller and/or rack controller of the mass data storage system can selectively power (e.g., power-on, power-off, spin-up, spin-down, etc.) an individual storage drive as desired to read/write data from the individual storage drive without having to supply power to the individual storage drive continuously. As used herein, the term "off state" refers to a state where no power is supplied to a device. One example selective powering operation powers a storage resource from an off state to an on state. In the on state, normal data transfer operations (e.g., read and write operations) of the storage device can be performed.

In another implementation, read/write control functions of one or more of the storage drives are retained within the storage drives and are thus not removed to the corresponding media unit controller or rack controller of the mass storage system. Therefore, some or all storage drives in the mass storage system 100 may retain self-powering resources and have the ability to effectuate a "power on" or "power off" mode change in response to communication from a rack controller or media unit.

In various implementations, the individual storage drives have characteristics present in existing state of the art storage drives with the exception that some or all of the control hardware and software is removed to the corresponding media unit controller and/or rack controller, thereby centralizing control functions of the individual storage drives to a media unit level and/or a rack level. Further, the individual storage drives may utilize any available storage technology (e.g., magnetic storage, optical storage, semi-conducting storage (e.g., flash-based solid state)).

Further, by moving some or all of the control hardware/software of the individual storage drives out of the individual storage drives and into the corresponding media unit controller and/or rack controller, the individual storage drives may have disparate characteristics and the operation of the mass data storage system 100 may be optimized based on the performance characteristics of the storage drives available within the system 100. In one example implementation, each of the individual storage drives within a media unit has disparate performance characteristics, but each media unit has the same performance characteristics (i.e., similar within industry acceptable tolerances).

Drives with performance characteristics that meet an operational threshold may be characterized as having the same (or similar) performance characteristics. For example, 4 terabyte drives have the capability of storing at least 4 terabytes of data and are formatted to store 4 terabytes of data. Drives that meet this threshold are referred to herein as having the same or similar storage capacity. Drives that do not have the capability of storing 4 terabytes of data and/or drives that are formatted to store a different quantity of data are referred to herein as having disparate storage capacity. Similarly, a 7200 RPM storage drive varies from 7200 RPM by no more than 1% during read/write operations. Drives that meet this operating limitation are referred to herein as having the same or similar rotational speeds. Drives that fail to meet this operating limitation are referred to herein as having disparate rotational speeds. Storage capacity and rotational speed are two example storage drive performance characteristics and other performance characteristics are contemplated herein.

In another example implementation, each of the individual storage drives within a media unit has disparate performance characteristics but the individual media units have the same (or similar) performance characteristics. In yet another example implementation, the individual storage drives and the media units overall have disparate performance characteristics. In still another example implementation, the individual storage drives each have different storage areas with disparate data format characteristics (e.g., one area of the individual storage drive is not encrypted and another area is encrypted). Some example performance characteristics of the individual storage drives or the media units overall are storage technology (e.g., magnetic, optical, semiconducting), storage capacity, read speed, write speed, and security level (e.g., encoded or not encoded), etc.

In some implementations, groupings of individual storage drives or media units with identical performance characteristics are defined by the corresponding media unit controller and/or rack controller as belonging to a common logical zone. In some implementations, a logical zone includes a selection of individual media units within a storage rack that may or may not be physically adjacent within the storage rack and may or may not share a power supply. For example, logical zone 126 includes physically adjacent media units 130, 132 and non-adjacent media unit 134 within storage rack 102. In other implementations, a logical zone includes a selection of individual storage drives within a storage rack that also may or may not be physically adjacent within the storage rack. For example, logical zone 136 includes a selection of four individual storage drives (e.g., storage drive 138) spanning two different media units within the storage rack 104. Groupings of individual storage drives or media units into logical zones may be made based on any criteria, and may even be arbitrary.

Responsive to receipt of a read or write command, the mass data storage system 100 uses a detailed mapping of the power network and storage resources within the power network to identify available storage locations to receive data (if the command is a write command) or act as a data source (if the command is a read command). Using a number of power constraints and data requirements, the mass storage system 100 selectively powers on one or more storage resources including the identified available storage locations. After execution of the read or write command, the selectively powered storage resources are returned to an off-line (powered off) state. Storage resources selectively powered for each data transfer operation (e.g., read operation or write operation) may be on the same or different media units, and also may be on the same or different storage racks.

Figure 2:
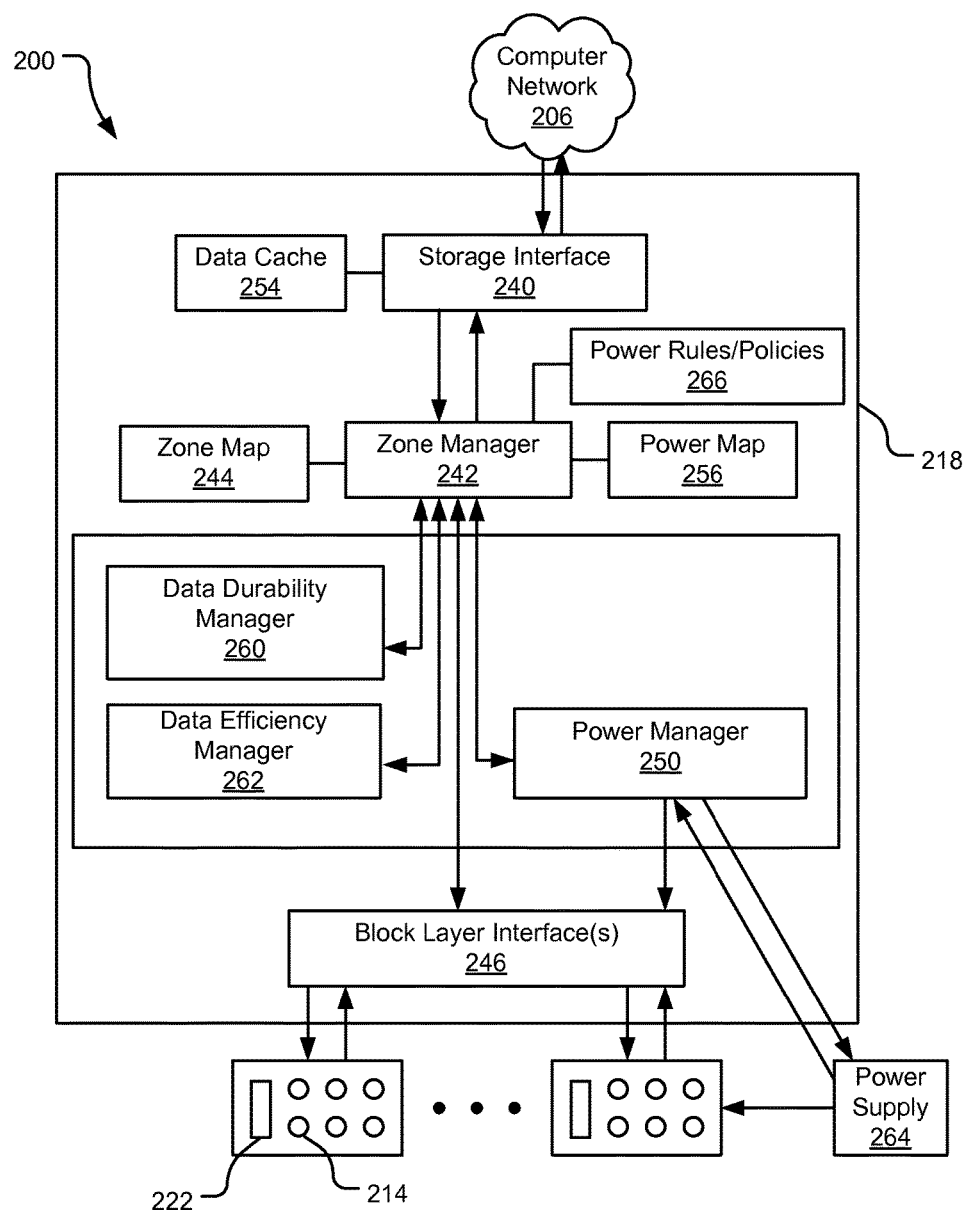
FIG. 2 illustrates an example control system for managing data transfer operations in a mass storage system.

FIG. 2 illustrates an example control system 218 for managing data transfer operations in a mass data storage system 200. Aspects of the mass data storage system 200 may be contained within a rack controller (e.g., rack controller 118 of FIG. 1) and/or a media unit controller (e.g., media unit controller 122 of FIG. 1 or a media unit controller 222 of FIG. 2) associated with each individual storage drive (e.g., a storage drive 214) of the mass data storage system 200. In some implementations, aspects of the storage system 200 may span multiple racks and/or geographic locations.

The control system 218 includes a storage interface 240 that allows the mass data storage system 200 to receive incoming data from external data source(s) from a computer network 206 and send outgoing data to external data destination(s) (see, e.g., external data source(s) and destination(s) 108 of FIG. 1) that may have disparate operating systems operating over one or more computer networks (see e.g., computer network 108 of FIG. 1).

A zone manager 242 works in conjunction with a zone map 244 and an incoming data/outgoing data cache 254, which allows the mass data storage system 200 to use and leverage media units (and storage drives) with disparate performance characteristics. As a result, non-compliant or obsolete storage drives that do not meet a particular performance threshold may be used in the mass data storage system 200 rather than being discarded. Also, many different types of drives may be used simultaneously in conjunction with one another with the zone manager 242 working in conjunction with the zone map 244 to maximize performance of the mass data storage system 200 overall based at least in part of the individual performance characteristics on the individual storage drives within the mass data storage system 200. In various implementations, the zone manager 242 is an object manager, a file system manager, or a proprietary interface, such as a block layer interface 246.

The zone manager 242 is communicatively coupled, through the block layer interface 246, to a plurality of storage nodes (e.g., rack controllers, media unit controllers, etc.) within the mass storage system 200. In one implementation, the storage nodes communicatively coupled to the zone manager 242 belong to the same logical zone and/or physical zone. In other implementations, the storage nodes communicatively coupled to the zone manager 242 belong to different logical zones and/or physical zones. Communication channels may allow for bidirectional data flow between all storage nodes in the mass data storage system 200. For example, the zone manager 242 may be communicatively coupled a plurality of different rack controllers; each rack controller may be communicatively coupled to media unit controllers within the corresponding rack; and each of the media unit controllers may be communicatively coupled to an associated nest of internal storage drives.

The zone manger 242 may be implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism.

In implementations where individual storage drives and/or entire media units are kept in a low power (e.g., spun down) or completely unpowered state during periods of inactivity, the zone manager 242 initially and/or periodically performs power mapping operations to identify the power needs of each individual storage drive and/or media unit and the power supply resources available to operate the storage drives and/or media units. The power needs and capabilities of the resources with the mass data storage system 200 are stored in a power map 256.

The zone manager 242 has access to a number of Power Rules and Policies 266, also referred to herein as power constraints. The Power Rules and Policies 266 regulate power consumption, distribution, and usage in the mass storage system 200. In one implementation, each storage rack is physically equipped with a power supply capable of powering a maximum number of storage drives and/or media units within the storage rack. The zone manager 242 stores this power constraint as one of the Power Rules and Policies 266, and applies this power constraint before powering a quantity of drives and/or media units within the storage rack to ensure that the mass storage system 200 does not exceed a maximum number of operable storage drives and/or media units within the storage rack.

In another implementation, each media unit is physically equipped with a power supply capable of powering a maximum number of storage drives within the media unit. The zone manager 242 stores this power consumption constraint as one of the Power Rules and Policies 266, and applies this power constraint before powering a quantity of drives within the media unit to ensure that the mass storage system 200 does not exceed a maximum number of operable storage drives within the media unit.

Responsive to a data transfer request (e.g., write or read request), the zone manager 242 identifies available storage resources (e.g., storage drives or media units) for receiving data or for acting as a data source. "Available" resources are storage resources that can be utilized for a read or write operation without violating one or more of the power constraints of the mass storage system 200. In one implementation, the zone manager 242 identifies available storage resources by querying system compute nodes through the block layer interface 246. In another implementation, the zone manager 242 identifies available storage resources by accessing the power map 256, which is periodically updated to include such information.

The zone manager 242 also communicates with a number of different managers (e.g., modules) to identify applicable read or write parameters for execution of the read or write operation. For example, the zone manager 242 may consult with a data durability manager 260 or a data efficiency manager 262 to ensure that the read or write operation is performed in compliance with various data durability and data efficiency requirements.

The data durability manager 260 manages a number of data durability requirements that specify, for example, a level of redundancy with which to encode incoming data and/or a degree of data replication with which to save the data within the mass storage system. In one implementation, the data durability manager 260 applies data durability requirements based on one or more attributes of the data relating to the read or write request. For example, a data durability requirement may specify that higher priority data be written with a higher redundancy and/or with greater instances of replication than lower priority data.

The data durability manager 260 may also recommend a level of customized data durability in the form of drive redundancy. For example, the data durability manager 260 may recommend that an erasure code for incoming data be spread across multiple storage drives for durability (e.g., erasure code is spread across 8 individual drives). Spreading the data over multiple drives helps to ensure that the data can be fully recovered within a maximum time period (such as TTD in some embodiments) even if one or more drives have failed or are temporarily inaccessible. The number of storage drives needed to support the erasure code may be defined by mass data storage system policy or by metadata on the incoming data. Data recovery can later be accomplished using various information dispersion algorithms. When data is retrieved from the mass storage system 200, the data durability manager 260 may recognize that data can be retrieved using fewer than the number of storage drives on which the data is saved. For example, the data durability manager 260 may recognize that the data is saved on eight storage drives, but that the data can be retrieved without violating durability requirements by reading data from three of the eight storage drives and applying various information dispersion algorithms to reassemble the data.

The data efficiency manager 262 manages a number of efficiency requirements for compressing and/or de-duplicating data to ensure that data is stored in a smallest possible form while still complying with data durability requirements of the data durability manager 260. In one implementation, the data efficiency manager 262 determines a minimum compression size for incoming data. The zone manager 242 may consult with the data durability manager 260 to determine whether storing the data at the minimum size violates any of the data durability requirements. In response, the data durability manager may recommend that the data be saved at the minimum size or at a larger size to allow for increased redundancies (e.g., if the data is high priority data, such as metadata).

The zone manager 242 uses feedback from the data durability manager 260 and the data efficiency manager 262 to select one or more of the available system resources for selective powering and consults with a power manager 250 to power up the selected storage drives or media units for the read or write operation using a power supply 264. In one implementation, the zone manager 242 communicates with the block layer interface 246 and one or more storage devices of the system through the power manager 250. For example, the power manager 250 may communicate with the block layer interface 246 through an inter-integrated circuit ("I2C") or SCSI enclosure services ("SES") interface.

The power supply 264 has the capability to simultaneously power one or more of the storage drives and media units within the rack. In various implementations, powering up and powering down a storage drive or a media unit refers to effecting a change in the power state within the device ranging from a completely unpowered state (no power is supplied to stored within the unit) or a fully powered state (the device is fully powered up, spinning if applicable, and ready for read/write operations) and various partial power states there between.

The power manager 250 sends power up instructions to the storage drives and/or media units and waits a predetermined quantity of time for asynchronous notification that the storage drives and/or entire media units were successfully powered up and are available for read/write operations.

If the storage drives and/or media units were successfully powered up, the power manager 250 may send a confirmation that the storage drives and/or media units are now available for read/write operations to the zone manager 242. If one or more storage drives and/or media units failed to power up successfully or failed to meet data durability requirements, the power manager 250 may send the zone manager 242 notice that the failed media units are not available for read/write operations.

The power manager 250 may suggest alternative storage drives and/or media units that are in the same logical zone(s) or cluster of logical zones to the zone manager 242. The zone manager 242 then selects the alternative storage drives and/or media units. In other implementations, the power manager 250 may automatically select other storage drives and/or media units to replace the storage drives and/or media units that failed to power up. The power manager 250 may then inform the zone manager 242 that the requested storage drives and/or media units were not available but specific alternative storage drives and/or media units are available instead.

During execution of the read or write command, the data efficiency manager 262 performs block level compression of incoming data and de-compression of outgoing data from the mass data storage system. The data efficiency manager 262 also performs duplication and de-duplication operations of the incoming and outgoing data. After execution of the read or write command, the zone manager 242 instructs the power manager 250 to use the power supply 264 to power down storage drives or media units that are not in use, such as the storage drives selectively powered for the read or write operation.

Figure 3:
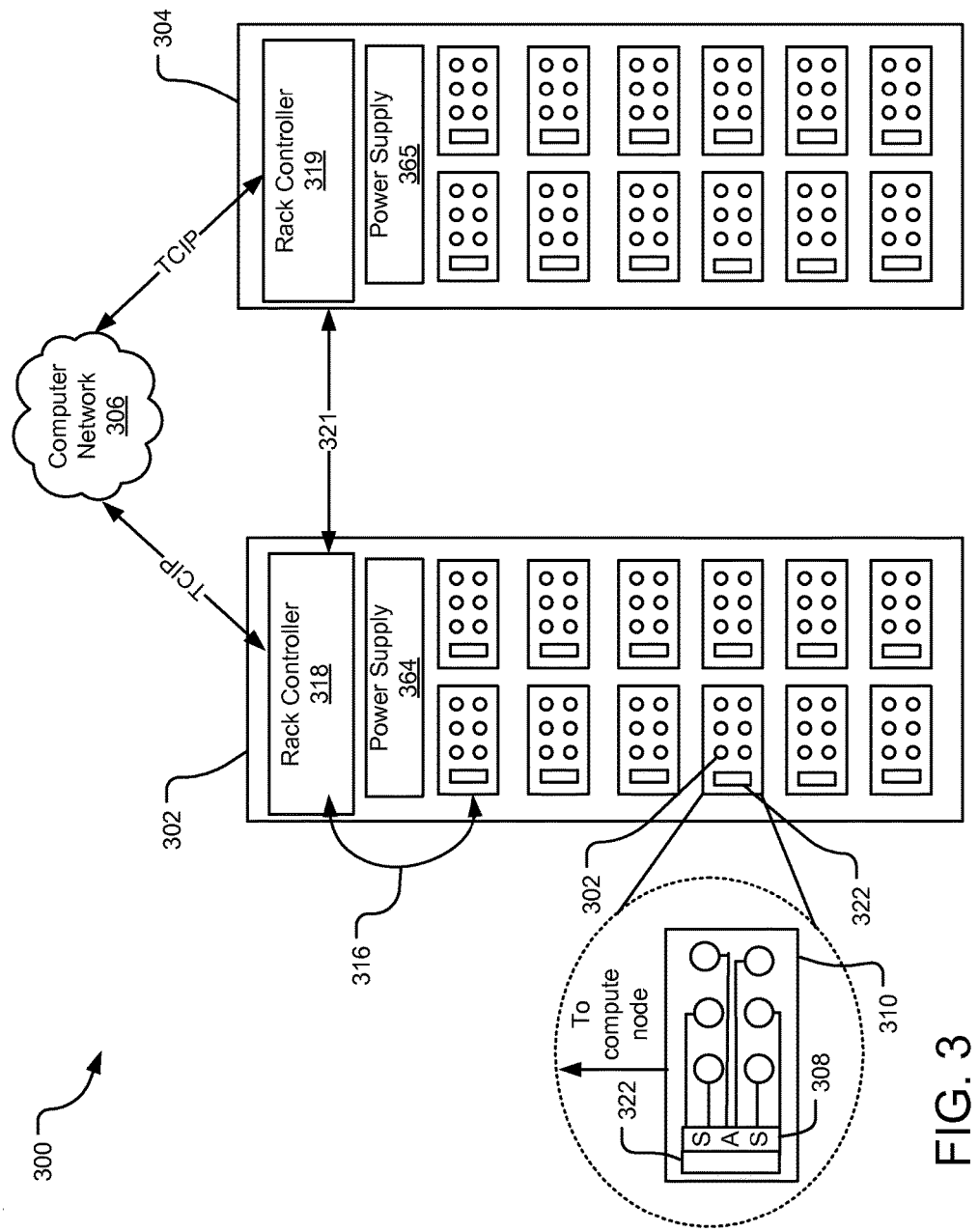
FIG. 3 illustrates another example mass data storage system with storage resources that can be selectively powered responsive to a data transfer request.

FIG. 3 illustrates yet another an example mass data storage system 300 with storage resources that can be selectively powered responsive to a read/write request. The mass data storage system 300 includes multiple racks (e.g., racks 302 and 304) that each includes a rack controller (e.g., rack controllers 318 and 319) and at least one power supply (e.g., power supplies 364 and 365). Each of the racks 302 and 304 further include an array of media units (e.g., a media unit 310), and each of the media units includes a media unit controller (e.g., a media unit controller 322). Further, each of the rack controllers 318 and 319 is communicatively coupled to the media unit controllers within the corresponding rack (e.g., the racks 302 and 304, respectively), and media unit controllers are communicatively coupled to an associated nest of storage drives (e.g., via compute nodes, serial attached SCSI ("SAS") connections, etc.)

In one implementation, a zone manager (e.g., the zone manager 242 of FIG. 2) or other control system module requests power information from compute nodes of the mass data storage system 300 to generate or update a power map. The power map includes information relating to each of the system resources including, for example, power needs and capabilities of each storage resource, physical locations of storage resources, power source distribution/sharing between the storage resources, etc.

In one implementation, computing nodes of the mass data storage system 300 are located within each rack controller (e.g., the rack controllers 318 and 319) and within each media unit controller (e.g., a media unit controller 322). The zone manager uses one or more available communication channels (e.g., I2C, SAS, SATA, USB, PCIe, or Ethernet, wireless channels, etc.) to initiate a discovery request for power information from each of the compute nodes (e.g., media unit controllers or rack controllers) of the mass data storage system 300. In one implementation, the zone manager requests the power information via a TCP/IP request through a computer network 306. In another implementation, the zone manager is implemented in the rack controller 318 and requests the power information from the compute nodes via one or more wired communication channels (e.g., wired communication channels 316 and 321).

Upon receipt of a discovery request, a compute node can transmit the request to other communicatively coupled compute nodes and/or respond to the request with the requested information. In one implementation, the rack controller 318 initiates a discovery request that is transmitted to all of the media unit controllers within the rack 302. Each of the media unit controllers gathers the requested information from the storage drives to which it has access via SAS connections and expanders (e.g., a SAS connection 308) or other suitable communication protocol. For example, the media unit controller 322 may gather power information relating to each of the six storage drives in the media unit 310. The gathered power information is transmitted back through the appropriate communication channels to the requesting compute node (e.g., the rack controller 318).

Compute nodes in the rack 302 can also transmit the discovery request to compute nodes outside of the rack 302. For example, the rack controller 318 can transmit the discovery request to the rack controller 319. In this manner, the discovery request propagates between racks (e.g., via the communication channel 321) also propagates to each compute node within each rack. According to one implementation, the zone manager uses the discovered power information to selectively power one or more available storage resources to enable data transfer operations of the mass data storage system 300.

Figure 4:
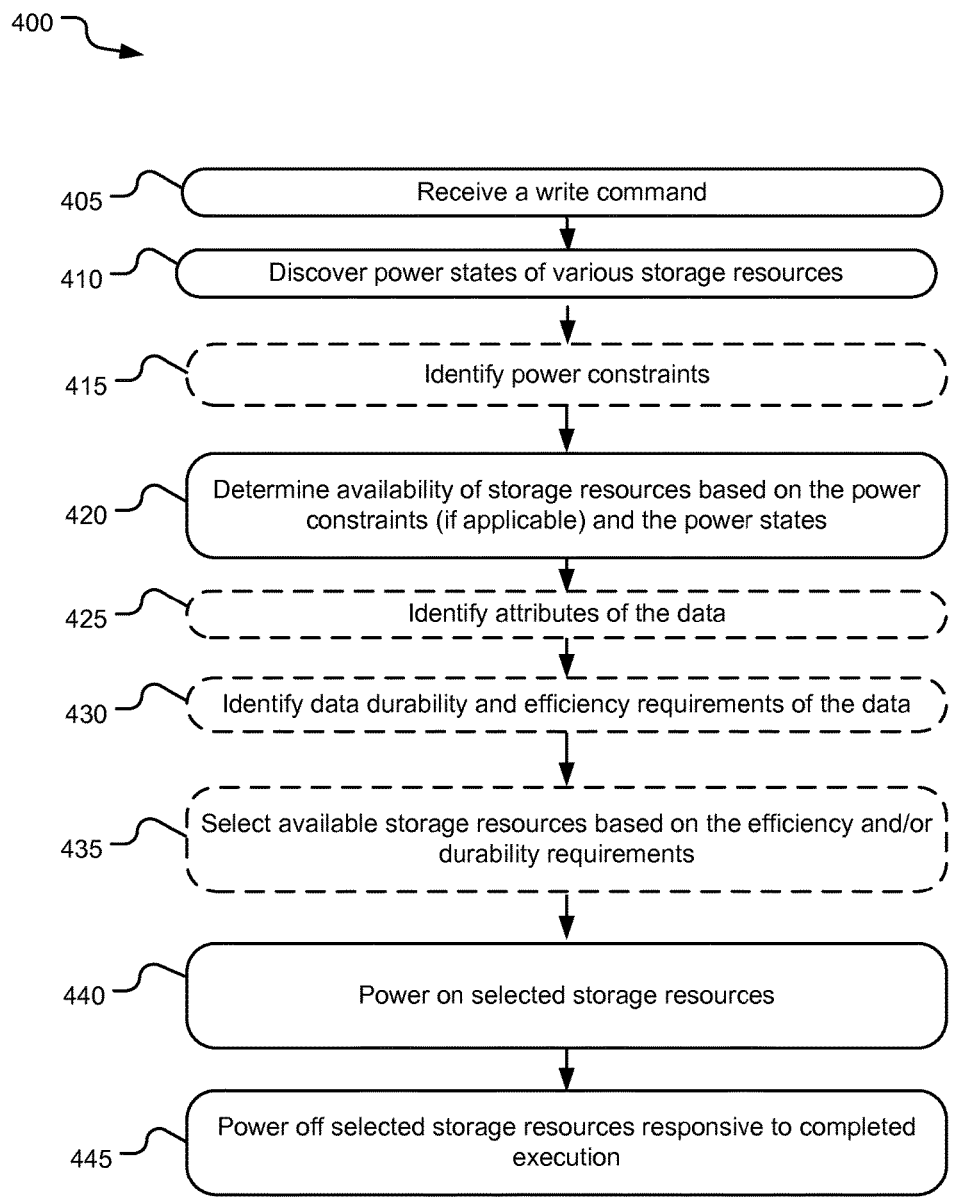
FIG. 4 illustrates example operations for executing a write command in an example mass storage system that selectively powers storage resources.

FIG. 4 illustrates example operations 400 for executing a write command in an example mass storage system that selectively powers storage resources. In FIG. 4 and other figures disclosed herein, dotted lines denote steps that are not included in some implementations of the disclosed technology. According to one implementation, the mass storage system includes multiple racks, each including a rack controller and an array of media units. Each of the media units comprises an array of individual storage drives controlled by a media unit controller. The operations 400 may be performed by one or more media units and/or one or more rack controllers.

A receiving operation 405 receives a write command including data to be saved within the mass storage system. A discovery operation 410 discovers power information regarding various resources in the mass storage system. In one implementation, a zone manager requests a "power discovery package" from each of a plurality of media unit controllers and/or rack controllers. Information included in the discovery package may include, for example, how many media units are connected to each power supply, which storage drives and/or media units are currently in use, available storage space on various storage drives, and/or power requirements for powering on each storage resource.

In one implementation, the discovery operation 410 requests one or more power discovery packages by initiating a query that descends intra-rack through a series of compute nodes (e.g., from a rack controller to media unit controllers) and/or travels between different racks, such as from one rack controller to another, descending through compute nodes of each respective rack. Compute nodes of the mass storage system retrieve the requested information and relay such information back through appropriate communication channels to the source of the request (e.g., a zone manager). For example, a media unit controller may be coupled to a number of internal storage drives via an SAS expander and can retrieve information from the coupled storage drives regarding power states, storage capabilities, and power requirements. In another implementation, the discovery operation 410 discovers the power information relating to various storage resources by accessing a periodically-updated power map.

Another identification operation 415 identifies power constraints (e.g., power rules or policies) of the mass storage system. "Power constraints" include for example, localized or system-wide caps set to constrain, distribute, and regulate power consumption for different components of the mass storage system, such as a media unit, rack, logical zone, physical zone, etc. In one implementation, a power constraint specifies a maximum number of storage drives that can be powered on per media unit at any given time. For example, a media unit may be permitted to power no more than two of six drives at any given time. In another implementation, a power constraint specifies a maximum rate of power consumption for powering various homogeneous and/or disparate storage resources within an individual media unit. In still another implementation, a power constraint limits the maximum number of storage resources that can be on-line and powered by an individual power source.

Different media units, racks, zones (e.g., logical or physical), etc. may have different power constraints.

In one implementation, the identification operation 415 is performed by consulting a number of stored power rules and policies and/or a power map that stores information regarding the storage capability and permissible power usage of various storage resources in the system. The power map may be created via an initial or periodic discovery operation that queries compute nodes for such information.

Using the power constraints identified via the identification operation 415 and the power information retrieved via the discovery operation 410, a determination operation 420 determines which storage resources of the mass storage system are available to receive data of the write operation (e.g., usable for a read or write operation without violating one or more power constraints of the mass storage system).

In one implementation, the identification operation 415 identifies a power constraint limiting the number of total drives that can be simultaneously powered up per media unit and the discovery operation 410 discovers which storage drives are currently on-line (e.g., powered on) in each media unit. Using this information, the determination operation 420 determines which drives are currently available in each media unit. If, for example, a media unit has two drives powered on and the maximum number of simultaneously powerable storage drives is limited to two, the determination operation 420 determines that the media unit is not available.

In another implementation, the discovery operation 410 discovers how many storage drives are currently online and the identification operation 415 identifies a power constraint limiting the total number of media units that can be on-line at one time while connected to a single power source. Using this information, the determination operation 420 determines how many drives are currently available in each media unit. If, for example, four media units share a power source, two of the four media units are currently online, and the total permissible number of online media units per power source is three, the determination operation 420 may determine that one of the four media units is available for the write operation.

Another identification operation 425 identifies attributes of the data including, for example, the size of the incoming data, the type of data (e.g., user data, metadata, etc.), the format of data (e.g., file or object), the priority of the data (e.g., high/low), redundancy information, etc.

Yet another identification operation 430 identifies applicable data durability requirements and data efficiency requirements associated with the data of the read or write request. Data durability requirements specify a level of redundancy with which to encode the incoming data and/or a degree of data replication within the mass storage system. In one implementation, the identification operation 430 identifies data durability requirements based on data attributes, such as a type of data identified (e.g., metadata, user data, security data, etc.) in the identification operation 425. For example, metadata may be deemed "higher priority" than user data and thus associated with different durability requirements than user data. One example data durability requirement specifies a number of storage drives on which to store erasure code of data relating to a write operation. Other example durability requirements specify other levels of data redundancy, such as redundancies in an error correction code.

The identification operation 430 also identifies applicable data efficiency requirements relating to data compression and/or de-duplication to reduce the amount of storage space needed to store data. For example, data efficiency requirements may specify a degree of compression and/or de-duplication that can be applied to the data. Like data durability requirements, data efficiency requirements may also be determined based on one or more data attributes.

A selection operation 435 selects one or more of the available storage resources based on the efficiency requirements and the data durability requirements identified via the identification operation 430. For example, a zone manager may determine the following: (1) that the applicable data efficiency requirements are satisfied if the data is saved on six or more storage drives; (2) that the data durability requirements are satisfied if the data is saved on seven or more storage drives; and (3) that saving the data on seven or more storage drives satisfies both the durability requirements and the efficiency requirements. Accordingly, the selection operation 435 selects seven of the available storage drives for receiving data of the write operation. The selection of storage drives from the plurality of identified available storage resources may be performed based on a number of factors and considerations other than, or in addition to, those described herein.

A power on operation 440 powers on the selected storage resources and executes the write command, writing data to the selected storage resources. Upon termination of the write operation, a power off operation 445 powers down the selected storage resources.

The above-discussed considerations may help to efficiently spread data across field replaceable units of the mass storage system so as to optimize data retrieval in the even of failure of one or more media units. The term "field replaceable unit" (FRU) may refer to an individual media unit or multiple media units. In various implementations, a variety of other constraints and requirements (in addition to or in lieu of those discussed herein) affect the identification of available storage resources and also the selection of available resources.

Figure 5:
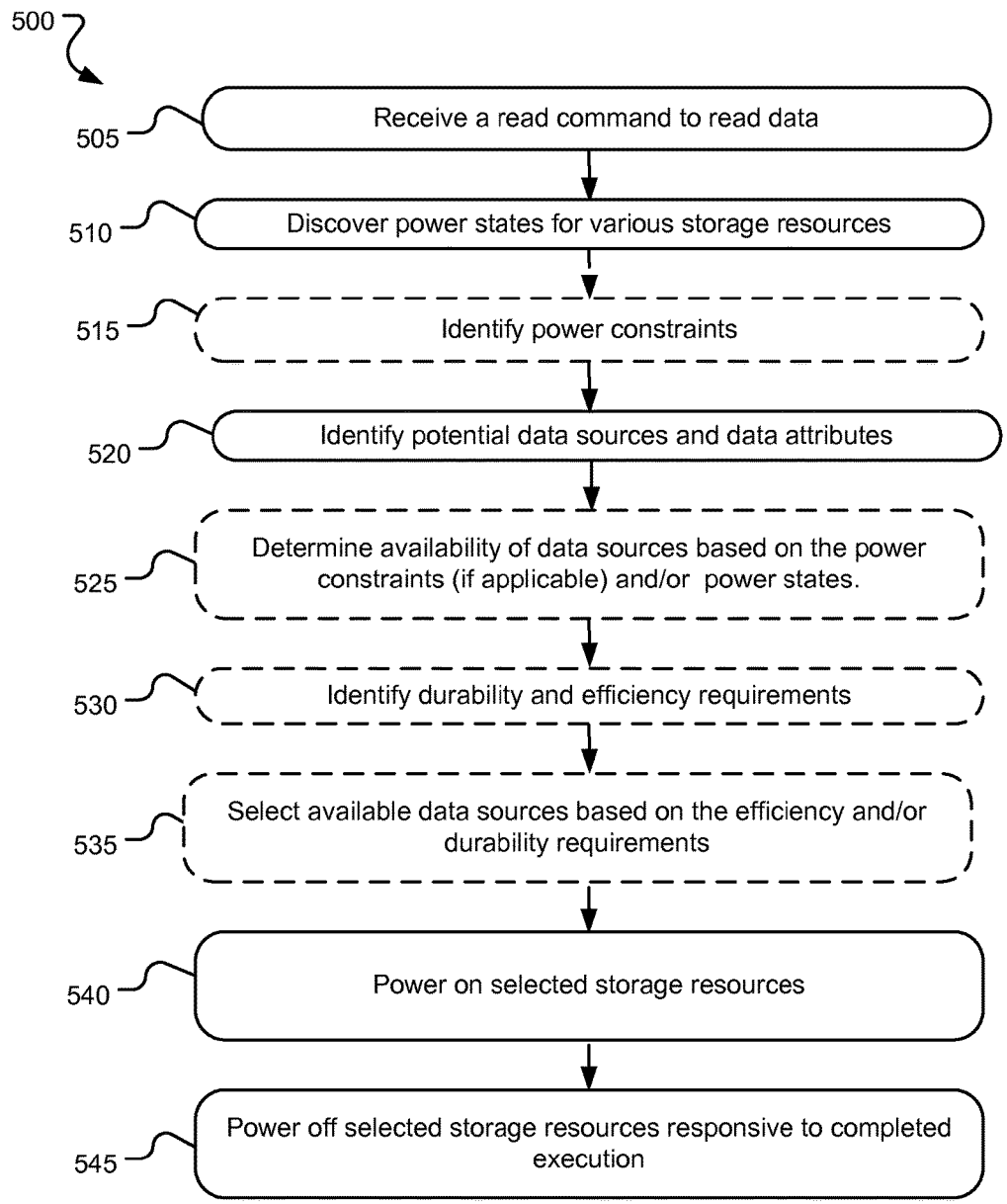
FIG. 5 illustrates example operations for executing a read command in an example mass storage system that selectively powers storage resources.

FIG. 5 illustrates example operations 500 for executing a read command in an example mass storage system that selectively powers storage resources. According to one implementation, the mass storage system includes multiple racks, each including a rack controller and an array of media units. Each of the media units comprises an array of individual storage drives controlled by a media unit controller.

A receiving operation 505 receives a read command to read data from the mass storage system. A discovery operation 510 discovers power information regarding various resources in the mass storage system. In one implementation, a zone manager requests a "power discovery package" from each of a plurality of media unit controllers and/or rack controllers. Information included in the power discovery package may include, for example, how many media units are connected to each power supply, which storage drives and/or media units are currently in use, available storage space on various storage drives, and/or power requirements for powering on each storage resource.

In one implementation, the discovery operation 510 requests one or more power discovery packages by initiating a query that descends intra-rack through a series of compute nodes (e.g., from a rack controller to media unit controllers) and/or travels between racks (inter-rack), such as from one rack controller to another, and descending through compute nodes of each respective rack. Various compute nodes of the mass storage system retrieve the requested power state information from the associated accessible storage drives and relay such information back through appropriate communication channels to the source of the request (e.g., a zone manager). In another implementation, the discovery operation 510 discovers the power information relating to various storage resources by accessing a periodically-updated power map.

Power constraints of the mass storage system are identified via an identification operation 515, and potential data sources storing the requested data are identified via an identification operation 520. In one implementation, the potential data sources are identified based on a logical block address or other information received with the read request. A determination operation 525 determines which of the identified potential data sources are available for the read operation based on the power constraints and the discovered power states for various system resources.

Yet another identification operation 530 identifies applicable data durability and data efficiency requirements associated with the data of the read request. In one implementation, the data durability requirements specify a minimum number of storage drives from which the requested data can be read to guarantee a minimum TTD. Data durability requirements for writing data may differ from data durability requirements for reading data. For example, data durability requirements may specify that data is to be written with redundancy information on at least eight different storage drives, but that the data can be read back from just four of the eight storage drives while guaranteeing a satisfactory TTD.

The identification operation 530 also identifies applicable data efficiency requirements to data decompression and/or duplication (e.g., to reverse initial de-duplication when the data is saved to the mass storage system). Like data durability requirements, data efficiency requirements may also be determined based on one or more data attributes.

A selection operation 535 selects one or more of the available resources based on the efficiency requirements and the data durability requirements identified via the identification operation 530. For example, a zone manager may determine (1) that the applicable data efficiency requirements are satisfied if the data is read from three or more storage drives; (2) that the data durability requirements are satisfied if the data is read from four or more storage drives; and (3) that reading the data from four or more storage drives satisfies both the durability requirements and the efficiency requirements. Accordingly, the selection operation 535 selects four of the available storage drives to read the data from. The selection of storage drives from the plurality of identified available storage resources may be performed based on a number of factors and considerations other than those described herein.

A power on operation 540 powers on the selected storage resources while the read command is executed and the data is read from the selected storage resources. Upon termination of the read operation, a power off operation 545 powers down the selected storage resources.

Figure 6:
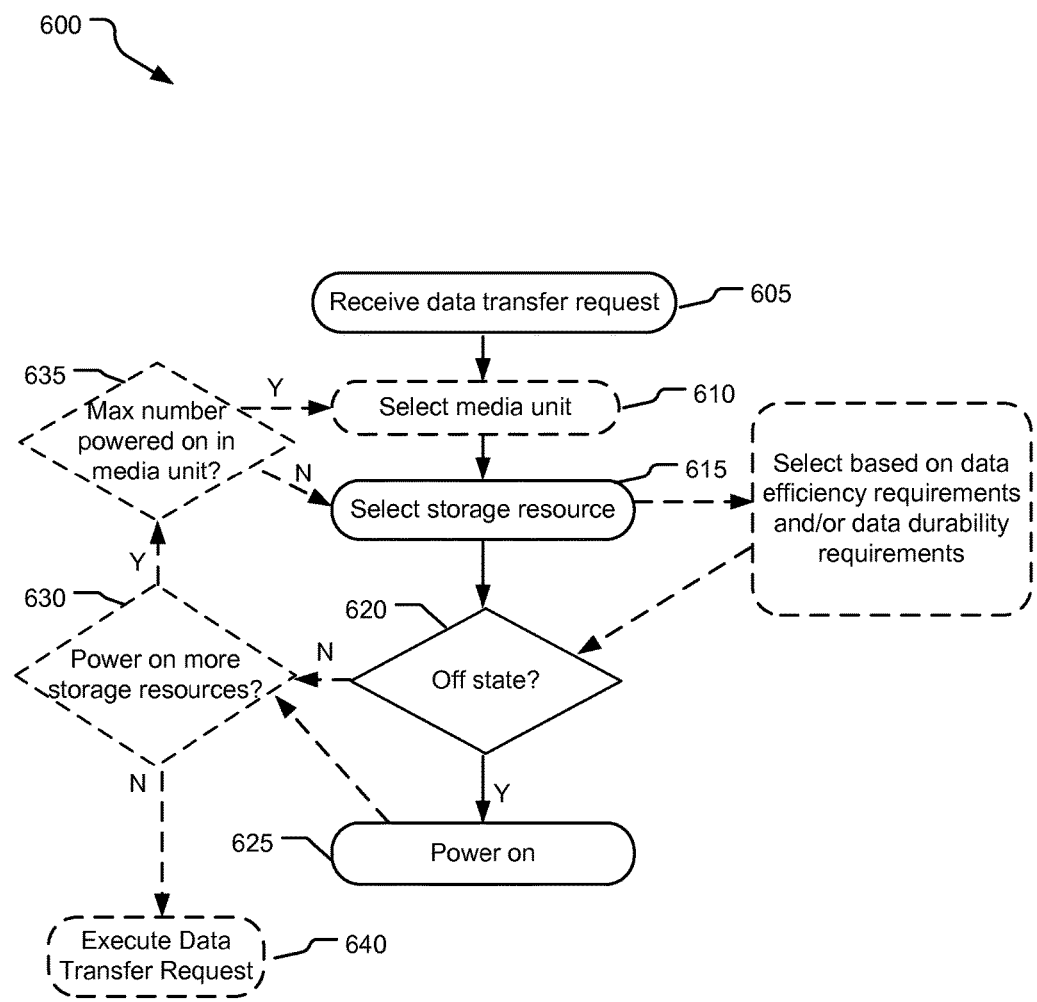
FIG. 6 illustrates example operations for executing a data transfer request in an example mass storage system that selectively powers storage resources.

FIG. 6 illustrates example operations 600 for executing a data transfer request in an example mass storage system that selectively powers storage resources. According to one implementation, the mass storage system includes multiple racks, each including a rack controller and an array of media units. Each of the media units comprises an array of individual storage drives controlled by a media unit controller. The operations 600 may be performed by one or more media units and/or one or more rack controllers.

A receiving operation 605 receives a request to transfer data (e.g., read or write data) from one or more storage resources in a mass data storage system. Responsive to the data transfer request, a selection operation 610 selects a media unit having one or more available storage resources. Another selection operation 615 selects an available storage resource within the selected media unit. According to one implementation, the selection operation 615 is based on a variety of factors including one or more power constraints, data efficiency requirements, and/or data durability requirements of the mass data storage system.

A determination operation 620 determines whether the selected storage resource is in the "off" state. If the determination operation 620 determines that the selected storage resource is in the "off" state, a powering operation 625 powers on the selected storage resource, and another determination operation 630 determines whether to power on additional storage resources to fulfill the data transfer request.

If the determination operation 620 determines that the selected storage resource is not in the "off" state, the determination operation 630 determines whether to power additional storage resources to fulfill the data transfer request.

If the determination operation 630 determines not to power on any additional storage resources, an execution operation 640 executes the data transfer request. If, on the other hand, the determination operation 630 determines to power on additional storage resources, another determination operation 635 determines whether additional storage resources in the selected media unit can be powered on without violating a power constraint.

If the determination operation 635 determines that additional resources in the selected media unit cannot be powered on without violating a power constraint, the selection operation 610 selects another media unit with available storage resources, and the operations 615 and 620 repeat, as indicated by the flowchart.

If, on the other hand, the determination operation 635 determines that additional resources in the selected media unit can be powered on without violating a power constraint, the selection operation 615 selects another storage resource within the selected media unit for selective powering. The operations 615, 620, etc. repeat, as indicated, until the determination operation 630 determines not to power on any more storage resources and the data transfer request is executed. In some implementations, one or more of the storage resources selected by the selection operation 615 are powered simultaneously instead of one-by-one, as described.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of operating a data storage system comprising:
identifying a plurality of storage resources available to receive data of a data transfer request based on at least one power constraint defining a maximum number of storage resources that can be simultaneously powered by a same power supply unit;
dynamically selecting a subset of the identified plurality of storage resources to receive the data;
selectively powering from an off state the selected subset of storage resources, the selected subset including at least two storage resources powered by different power supply units connected to a power grid of the data storage system; and
writing data of the data transfer request to the selected subset of storage resources.

2. The method of claim 1, wherein selectively powering the at least two storage resources further comprises:
selectively powering two or more disparate storage resources of the data storage system.

3. The method of claim 1, wherein the data transfer request is a write request, and the method further comprises:
responsive to a subsequent read request, reading the written data from the selected subset of the plurality of storage resources.

4. The method of claim 1, wherein dynamically selecting the subset of the identified plurality of storage resources to receive the data further comprises:
selecting the subset of the storage resources to selectively power based on at least one of a data efficiency requirement and a data durability requirement.

5. The method of claim 1, wherein the at least one power constraint further specifies a maximum number of storage drives per media unit that can be simultaneously powered on.

6. The method of claim 1, wherein the at least one power constraint further specifies a maximum number of media units that can be simultaneously powered on while connected to a common power source.

7. The method of claim 6, further comprising:
mapping individual storage resources to connected power supplies; and
selecting the identified plurality of storage resources based on the mapping and on the at least one power constraint.

8. The method of claim 1, wherein identifying the plurality of storage resources available to receive the data of the data transfer request is further based on a current power state of each of the plurality of storage resources of the data storage system.

9. A system comprising:
a zone manager communicatively coupled to a plurality of storage resources in a mass data storage system and configured to:
identify a plurality of storage resources available to receive data of a data transfer request based on at least one power constraint defining a maximum number of storage resources that can be simultaneously powered by a same power supply unit;
dynamically select a subset of the identified plurality of storage resources to receive the data; and
selectively supply power to the selected subset of storage resources, the selected subset including at least two of the storage resources powered by different power supply units, wherein the zone manager is further configured to write data of the data transfer request to each storage resource of the selected subset of storage resources.

10. The system of claim 9, wherein the zone manager is further configured to selectively supply the power to two or more disparate storage resources of the mass data storage system responsive to the data transfer request.

11. The system of claim 9, wherein the zone manager identifies the plurality of storage resources available to receive the data of the data transfer request based on the at least one power constraint and a current power state of each of the plurality of storage resources of the mass data storage system.

12. The system of claim 11, wherein the zone manager is further configured to:
map individual storage resources to connected power supplies; and
select the subset of storage resources to receive the data based on the mapping and on the power constraint.

13. The system of claim 9, wherein the zone manager is further configured to:
select the subset of the storage resources to receive the data based on at least one of a data efficiency requirement and a data durability requirement.

14. The system of claim 9, wherein the zone manager is further configured to discover a current power state of each of the plurality of storage resources of the mass data storage system.

15. The system of claim 9, wherein the zone manager is further configured to disconnect power from the selected subset of storage resources responsive to completed execution of the data transfer request.

16. A non-transitory computer-readable medium containing processor-executable instructions that, when executed by a processor, cause the processor to:
identify a plurality of storage resources available to receive data of a data transfer request based on at least one power constraint defining a maximum number of storage resources that can be simultaneously powered by a same power supply unit;
dynamically select a subset of the identified plurality of storage resources to receive the data;
selectively supply power to the selected subset of storage resources, the selected subset including at least two storage resources powered by different power supply units within a mass data storage system;
write data of the data transfer request to the selected subset of storage resources; and
selectively remove power from the selected subset of storage resources responsive to completed execution of the data transfer request.

17. The computer-readable medium of claim 16, containing further processor-executable instructions that cause the processor to:
select the subset of the identified plurality of storage resources to receive the data based on at least one of a data efficiency requirement and a data durability requirement.

18. The computer-readable medium of claim 16, wherein the selected subset of storage resources includes a media unit arranged in a rack of media units, each media unit including a plurality of storage drives.

19. The computer-readable medium of claim 16, wherein identifying the plurality of storage resources available to receive the data of the data transfer request is further based on a current power state of each of the plurality of storage resources of the mass data storage system.

20. The computer-readable medium of claim 16, wherein the power constraint further specifies a maximum number of media units that can be simultaneously powered on while connected to a common power source.

* * * * *